(12) United States Patent
Caspi

(10) Patent No.: US 12,535,678 B2
(45) Date of Patent: Jan. 27, 2026

(54) EYE TRACKING DEVICE

(71) Applicant: JERUSALEM COLLEGE OF TECHNOLOGY, Jerusalem (IL)

(72) Inventor: Avraham Itzhak Caspi, Rehovot (IL)

(73) Assignee: JERUSALEM COLLEGE OF TECHNOLOGY, Jerusalem (IL)

( * ) Notice: Subject to any disclaimer, the term of this patent is extended or adjusted under 35 U.S.C. 154(b) by 0 days.

(21) Appl. No.: 18/850,196

(22) PCT Filed: Mar. 29, 2023

(86) PCT No.: PCT/IL2023/050324
§ 371 (c)(1),
(2) Date: Sep. 24, 2024

(87) PCT Pub. No.: WO2023/187780
PCT Pub. Date: Oct. 5, 2023

(65) Prior Publication Data
US 2025/0216671 A1    Jul. 3, 2025

Related U.S. Application Data

(60) Provisional application No. 63/325,200, filed on Mar. 30, 2022.

(51) Int. Cl.
G02B 27/00        (2006.01)
G02B 27/01        (2006.01)
G06F 3/01         (2006.01)

(52) U.S. Cl.
CPC ..... G02B 27/0093 (2013.01); G02B 27/0172 (2013.01); G06F 3/013 (2013.01);
(Continued)

(58) Field of Classification Search
CPC .............. G02B 27/0093; G02B 27/017; G02B 27/0172; G02B 2027/013;
(Continued)

(56) References Cited

U.S. PATENT DOCUMENTS 6,433,760 B1    8/2002 Vaissie et al.
10,429,657 B1   10/2019 Sharma et al.
(Continued)

FOREIGN PATENT DOCUMENTS

WO    2021130739 A1    7/2021

OTHER PUBLICATIONS

G. Dagnelie and R. W. Massof, "Toward an artificial eye," in IEEE Spectrum, vol. 33, No. 5, pp. 20-29, May 1996, doi: 10.1109/6.490053.
(Continued)

*Primary Examiner* — Cory A Almeida
(74) *Attorney, Agent, or Firm* — The Roy Gross Law Firm, LLC; Roy D. Gross

(57) ABSTRACT

An arrangement for tracking a position of an individual's eye comprises: (a) a frame mountable on a head of an individual; (b) at least one visually transparent element mounted within the frame in a the field of view of an eye of the individual; (c) at least one infrared light source configured for emitting an infrared light beam; (d) an image sensor configured for capturing images of the eye; (e) a processing unit configured for controlling the infrared light source and the image sensor and detecting a pupil position and a corneal reflection within images captured the at least image sensor. The transparent element comprises a spectrally-selective layer configured for reflecting the infrared beam. The visually transparent element is configured for selectively directing the infrared beam onto the eye and directing an infrared radiation reflected from a pupil and cornea of the eye to the image sensor.

9 Claims, 9 Drawing Sheets

(52) U.S. Cl.
CPC .................. *G02B 2027/013* (2013.01); *G02B 2027/0138* (2013.01); *G02B 2027/014* (2013.01); *G02B 2027/0178* (2013.01); *G02B 2027/0187* (2013.01)

(58) Field of Classification Search
CPC ...... G02B 2027/0138; G02B 2027/014; G02B 2027/0178; G02B 2027/0187
See application file for complete search history.

(56) References Cited

U.S. PATENT DOCUMENTS

| | | |
|---|---|---|
| 10,877,556 B2 | 12/2020 | Berkner-Cieslicki et al. |
| 11,022,809 B1 | 6/2021 | Richards et al. |
| 11,550,160 B1* | 1/2023 | Sharma .............. G02B 27/0179 |
| 2018/0039327 A1 | 2/2018 | Noda et al. |
| 2018/0103843 A1* | 4/2018 | Hwang ................... A61B 3/14 |
| 2019/0012540 A1 | 1/2019 | Trail |
| 2019/0384388 A1 | 12/2019 | Price et al. |
| 2020/0333592 A1 | 10/2020 | Hatzilias et al. |
| 2020/0372678 A1 | 11/2020 | Farmer et al. |
| 2021/0041948 A1 | 2/2021 | Berkner-Cieslicki et al. |

OTHER PUBLICATIONS

PCT International Search Report for International Application No. PCT/IL2023/050324, mailed Aug. 20, 2023, 6pp.
PCT Written Opinion for International Application No. PCT/IL2023/050324, mailed Aug. 20, 2023, 11pp.
PCT International Preliminary Report on Patentability for International Application No. PCT/IL2023/050324, completed Jun. 13, 2024, 11pp.

* cited by examiner

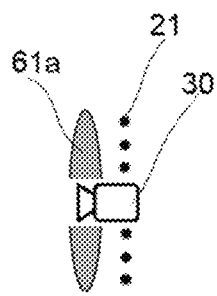
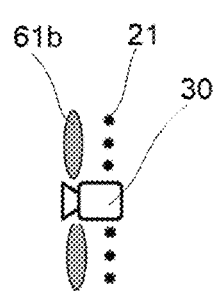
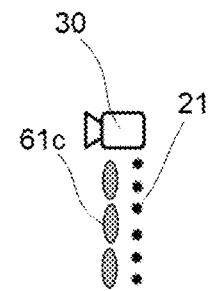
Fig. 6a         Fig. 6b         Fig. 6c
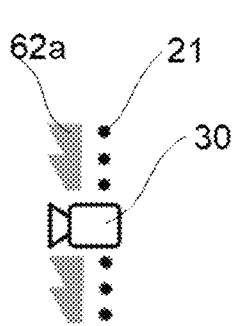
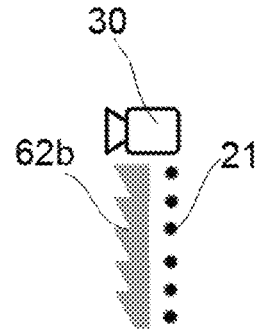
Fig. 6d         Fig. 6e

EYE TRACKING DEVICE

CROSS REFERENCE TO RELATED APPLICATIONS

This application is a National Phase of PCT Patent Application No. PCT/IL2023/050324 having International filing date of Mar. 29, 2023, which claims the benefit of priority of U.S. Provisional Patent Application No. 63/325,200, filed Mar. 30, 2022, the contents of which are all incorporated herein by reference in their entirety.

FIELD OF THE INVENTION

The present invention relates to eyeball tracking devices and, more particularly, to the aforesaid devices embedded into an eyewear such as spectacles, protective glasses, virtual and augmented reality devices.

BACKGROUND OF THE INVENTION

Eye tracking is the process of measuring either the point of gaze, where one is looking, during fixation or the motion of the eyes relative to the head. An eye tracker is a device for measuring eye positions and eye movement. Eye trackers are used in research on the visual system, in psychology, in psycholinguistics, marketing, as an input device for human-computer interaction, and in product design. Eye trackers are also being increasingly used for rehabilitative and assistive applications related, for instance, to control of wheel chairs, robotic arms and prostheses. Recently it was shown that it can be used to enhance functionality of visual prosthesis and low vision aids.

The publication of G. Dagnelie and R. Massof, Toward an Artificial Eye, *IEEE Spectrum*, May 1996, pp. 21-29 discloses a head-mounted arrangement including an optical fiber connectable to an infrared light source, gimballed mirror, and a hot mirror which are cooperatively configured illuminating the individual's eye. Infrared light reflected from the eye ball is detected by an image sensor.

U.S. Pat. No. 10,877,556 discloses an eye tracking system for detecting position and movements of a user's eyes in a head-mounted display (HMD). The eye tracking system may include at least one near-IR (NIR) eye tracking camera positioned at each side of the user's face and pointed towards eye-facing surfaces of eyepieces of the HMD, an illumination source that emits NIR light towards the user's eyes, and hot mirrors located between the eye-facing surfaces of the eyepieces and the user's eyes. The hot mirrors reflect at least a portion of NIR light, while allowing visible light to pass. The cameras capture images of the user's eyes reflected by the hot mirrors. Positioning the hot mirrors at or near the eye-facing surfaces of the eyepieces allows the cameras to be placed at the sides of the user's face without having to image through the eyepieces.

US 20190384388 discloses a method for active eye-tracking comprising pulsing on and off a plurality of infrared optical sources configured to emit infrared light with a narrow spectral linewidth toward an eye of a user, such that a pulse-on duration is less than a duration needed to fully thermalize each optical source. One or more shuttered optical sensors are configured to receive infrared light reflected off the eye of the user. The shuttered optical sensors are opened for a detection duration based on the pulse-on duration, the shuttered optical sensors. A conformation of the user's eye is indicated based on infrared light received at the shuttered optical sensor during the detection duration.

US 20190012540 discloses an eyewear device having an optical element, a source, a dichroic mirror, and a camera. The optical element has a front surface, a back surface, a rim, and an angled portion of the rim. The source emits light in a first band of light and is configured to illuminate a portion of an eye of a user of the eyewear device. The dichroic mirror is arranged proximate to the angled portion of the rim, is reflective in the first band of light, is transmissive in a second band of light, and is configured to direct light in the first band reflected from the portion of the eye toward a first position. The camera is located in the first position that is located in a plane of the optical element, and the camera is configured to capture images of the light in the first band reflected by the dichroic mirror.

U.S. Pat. No. 10,429,657 discloses a head-mounted display (HMD) including a pancake lens block, an eye tracking system, and an electronic display. The electronic display is coated with a dichroic film that transmits visible light and reflects infrared light (IR). An IR emitter illuminates an eye of the user, and infrared light is reflected from an eye through the pancake lens block and is incident on the dichroic film. The reflected light undergoes multiple reflections before being captured by an image capturing element of the eye tracking system that is positioned at a periphery of HMD located off-axis relative to an optical axis of the pancake lens block. Moreover, each reflection results in a particular view of the eye that results in multiple views of the eye being received by the image capturing element.

US 20210041948 discloses an eye tracking system for detecting position and movements of a user's eyes in a HMD. The eye tracking system includes at least one eye tracking camera, an illumination source that emits infrared light towards the user's eyes, and diffraction gratings located at the eyepieces. The diffraction gratings redirect or reflect at least a portion of infrared light reflected off the user's eyes, while allowing visible light to pass. The cameras capture images of the user's eyes from the infrared light that is redirected or reflected by the diffraction gratings.

U.S. Pat. No. 11,022,809 discloses a head-mounted display device including one or more infrared light sources configured to emit infrared light toward one or more eyes of a wearer, a first mirror configured to transmit the infrared light reflected from the one or more eyes of the wearer toward the first mirror, that reaches the first mirror at a first incident angle, the second mirror configured to reflect the infrared light transmitted through the first mirror, toward the first mirror so that the first mirror is configured to reflect the infrared light reflected by the second mirror, and incident on the first mirror at a second incident angle that is greater than the first incident angle, one or more sensors configured to detect the infrared light reflected by the first mirror and the second mirror for determining a gaze direction of the one or more eyes of the wearer.

The analysis of the prior art literature indicates that, in the known technical solutions, the optical element for correcting individual's sight and the hot mirror are embodied as separate elements resulting in unhandiness and inconvenience for a user. Furthermore, in prior art literature, the illuminators are spread on the frame requiring a complex setup. Therefore, there is a long-felt and unmet need to provide a compact wearable spectacle-embedded device for tracking an eyeball position.

SUMMARY OF THE INVENTION

It is hence one object of the invention to disclose an arrangement for tracking a position of an individual's eye.

The aforesaid arrangement comprises: (a) a frame mountable on a head of an individual; (b) at least one visually transparent element mounted within the frame in a field of view of an eye of the individual; (c) at least one infrared light sources; the infrared light source configured for emitting an infrared light beam; (d) at least one image sensor configured for capturing images of the eye or the eyes and (e) a processing unit configured for controlling said at least one infrared light source and at least one image sensor and detecting a pupil position and a corneal reflection within images captured said at least image sensor. The illuminators and the sensor can capture images of a single eye, i.e. monocularly, or of both eyes, i.e. binocularly.

It is a core purpose of the invention to provide the transparent element comprising a spectrally-selective layer configured for reflecting the infrared beam; the visually transparent element is configured for selectively directing the infrared beam onto the eye and directing an infrared radiation reflected from a pupil and cornea of the eye to the image sensor.

Another object of the invention is to disclose the spectrally-selective layer configured for spectrally selective focusing and steering the IR beam.

A further object of the invention is to disclose the frame which is selected from the group consisting of spectacles, protective glasses, a virtual reality device, an augmented reality device and any combination thereof.

A further object of the invention is to disclose the processing unit configured for predicting directions of eye movements and the gaze position of the user.

A further object of the invention is to disclose the arrangement comprising a display and an optical arrangement cooperatively configured for projecting an image or a movie of an object of interest via the visually transparent element being a combining optical element of the virtual reality device or said augmented reality device into a simultaneous field of view of the eye such that the object of interest is in sight of said individual.

A further object of the invention is to disclose the spectrally-selective coating which is a dichroic coating.

A further object of the invention is to disclose the visually transparent element comprising at least two components having contact surfaces disposed in an adjacent manner;

A further object of the invention is to disclose at least one of the contact surfaces carries the spectrally-selective layer selected from the group consisting of a dichroic coating; a corrugate surface, a diffractive optical element and any combination thereof.

A further object of the invention is to disclose the contact surfaces formed in a shape selected from the group consisting of a planar shape, a spherical shape, an aspherical shape and any combination thereof.

A further object of the invention is to disclose the infrared light source which is a matrix of IR light emitting diodes.

A further object of the invention is to disclose the arrangement for tracking a position of an individual's eye comprising at least one lens matrix or prism disposed between said matrix of said infrared light source and said visually transparent element.

A further object of the invention is to disclose the processing unit configured to activate predetermined arrays of said infrared light emitting diodes within said matrix of said infrared light emitting diodes and detect said pupil position and corneal reflection within said captured images in correlation with said activated arrays of infrared light emitting diodes A further object of the invention is to disclose a method of tracking a position of an individual's eye. The aforesaid method comprises steps of: (a) providing an arrangement for tracking a position of an individual's eye; the arrangement comprising: (i) a frame mountable on a head of an individual; at least one visually transparent element mounted within the frame in a field of view of the eye of the individual; (ii) at least one infrared light sources; the infrared light source configured for emitting an infrared light beam; (iii) at least one image sensor configured for detecting infrared light reflected from the eye; (iv) a processing unit configured for controlling said at least one infrared light source and at least one image sensor and detecting a pupil position within images captured said at least image sensor; the transparent element comprises a spectrally-selective layer configured for reflecting the infrared beam; the visually transparent element is configured for selectively directing the infrared beam onto the eyeball and directing an infrared radiation reflected from a pupil and cornea of the eye to the image sensor; (b) emitting the infrared beam by the infrared light source; (c) illuminating the eye by the infrared beam directed thereto by the visually transparent element; (d) detecting pupil and cornea positions within an image of the eye reflected by the visually transparent element; and (e) obtaining an eye movement trajectory.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which

FIGS. 6a to 6e are schematic side views of alternative embodiments of an arrangement including a camera, a LED matrix and a focusing lens or refractive prism;

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide an eye tracking device and a method of tracking a position of an individual's eye.

Figure 1:
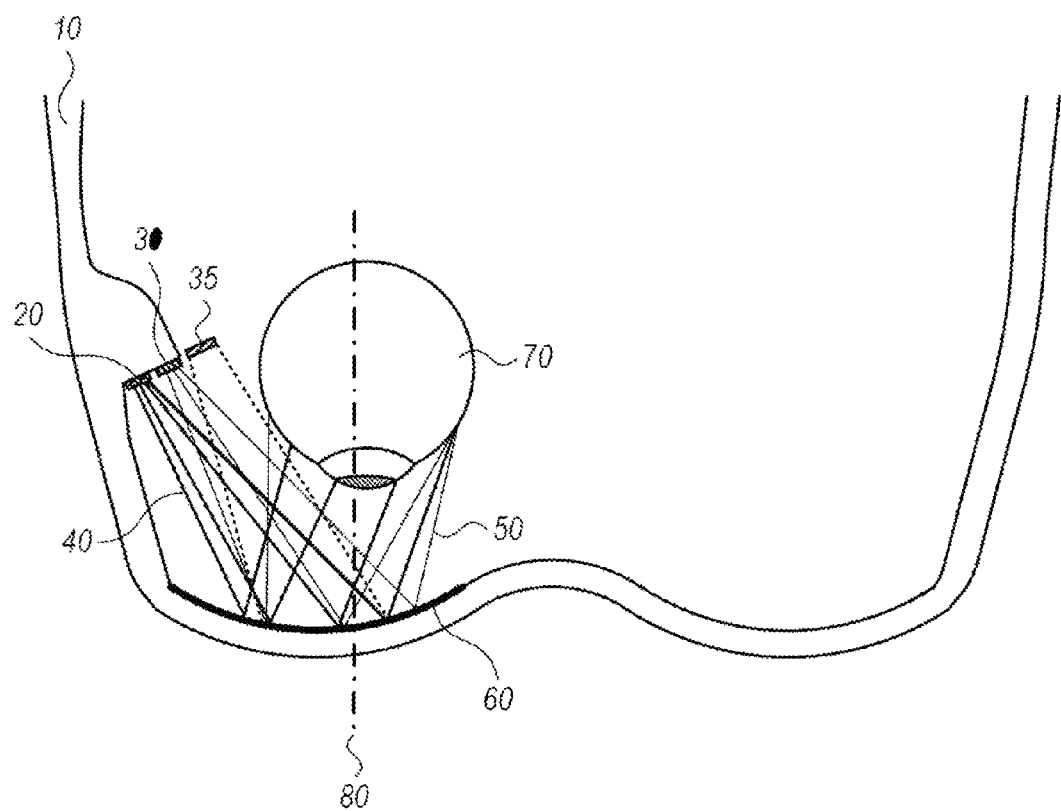
FIG. 1 is a schematic diagram of an eye tracking device.

Reference is now made to FIG. 1 presenting a schematic diagram of an eye tracking device. The aforesaid device comprises frame 10 mountable on a head of an individual. Frame 10 holds a visually transparent element 60. According to an exemplary embodiment of the present invention, frame 10 is a spectacle frame. Source 20 emits infrared light beam 40, which after reflection from visually transparent element 60 is directed to individual's eye 70. Numeral 50 refers to a beam of reflected/scattered from individual's eye 70 capturable by image sensor 30. Processing captured images by a processing unit (not shown) results in a trajectory of eye movement. Visually transparent element 60 may have spherical/aspherical/cylindrical outside surfaces and function as a spectacle lens with viewing axis 80.

According to one embodiment of the present invention, the eye tracking device further comprises display 35 and an optical arrangement (not shown) cooperatively configured for projecting an image or a movie of an object of interest via visually transparent element 60 being a combining optical element of the virtual reality device or an augmented reality device into a field of view of the eye. The processing unit is configured for predicting directions of eye movements and the gaze position of the user before the eye comes to rest. According to the present invention, a high frame-rate sensor samples a plurality of points during the initial phase of the saccade and estimates the landing point before the eyes reach a complete stop at a target gaze position. The processing unit is configured for presenting information such as text, icons or images at the predicated gaze location and the dedicated information. The device updates the landing gaze position during the saccade in a real-time manner.

Figure 2:
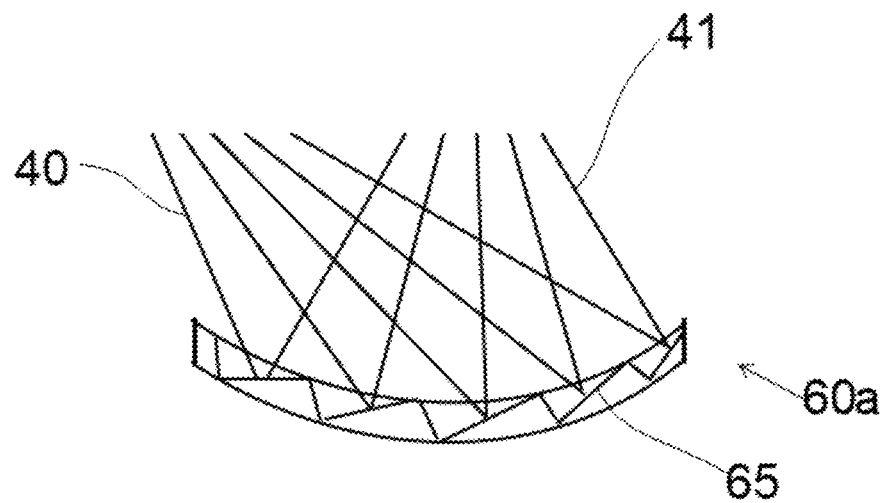
FIGS. 2 and 3 are schematic diagrams of visually transparent elements that reflect and focus the IR light.

Reference is now made to FIG. 2 presenting first embodiment 60a of visually transparent element 60 (FIG. 1). Numeral 65 refers to an internal relief configured for reflecting incident infrared rays 40 such that reflected/refracted/diffracted infrared rays 41 are directed to eye 70 (FIG. 1). Macro-corrugate relief 65 embodied as an internal structure with variation of refractive index which reflects/refracts the incident infrared light. An internal or superficial diffractive optical element is also in the scope of the present invention.

Figure 3:
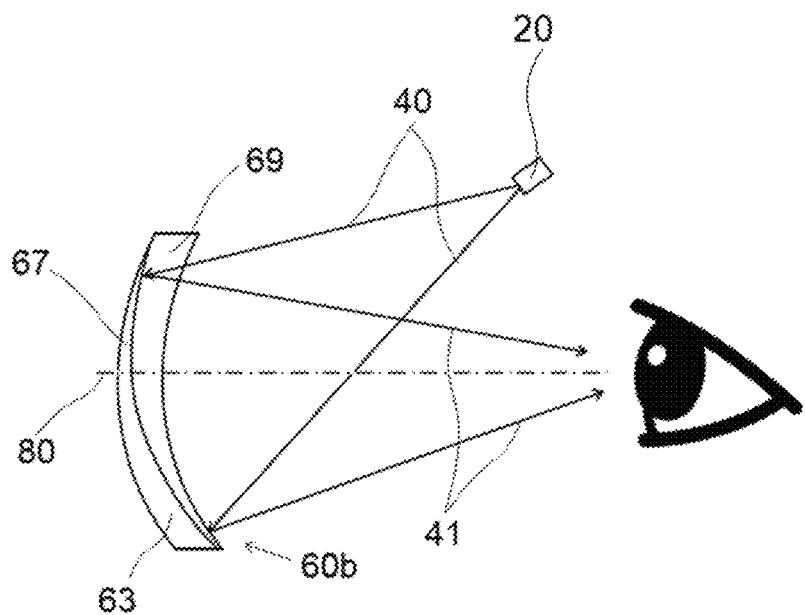

Reference is now made to FIG. 3 presenting second embodiment 60b of visually transparent element 60 (FIG. 1). Dichroic (hot) mirror 67 is disposed between visually transparent members 63 and 69. According to one embodiment of the present invention, members 63 and 69 dichroic mirror 67 are in an optical contact therebetween. Visually transparent members 63 and 69 can have spherical/aspherical/cylindrical outside surfaces and function as a spectacle lens along viewing axis 80. Dichroic (hot) mirror 67 can be spherically/aspherically/cylindrically shaped and function as a focusing mirror which directs rays 40 to eye 70 and reverting reflected/scattered rays 50 to image sensor 30.

Figure 4A:
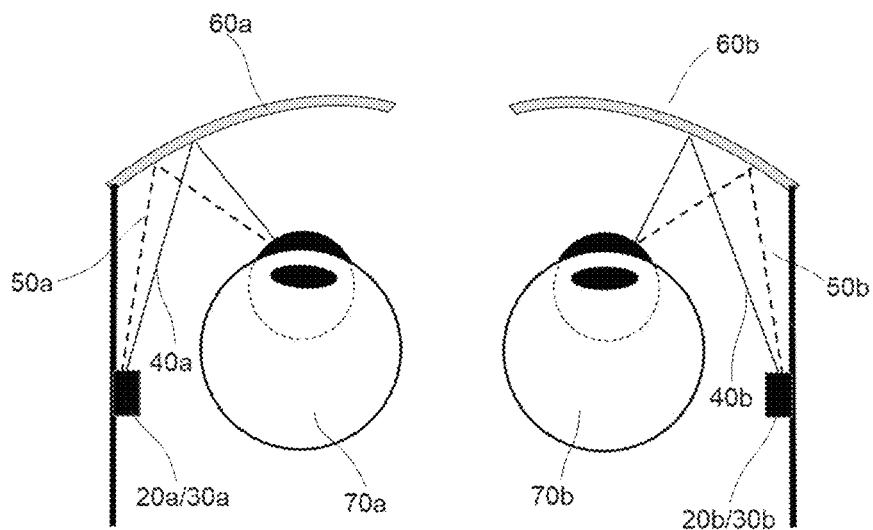
FIGS. 4a and 4b are schematic diagrams illustrating detecting binocularly reflected IR light from individual's eyes in two positions.
Figure 4B:
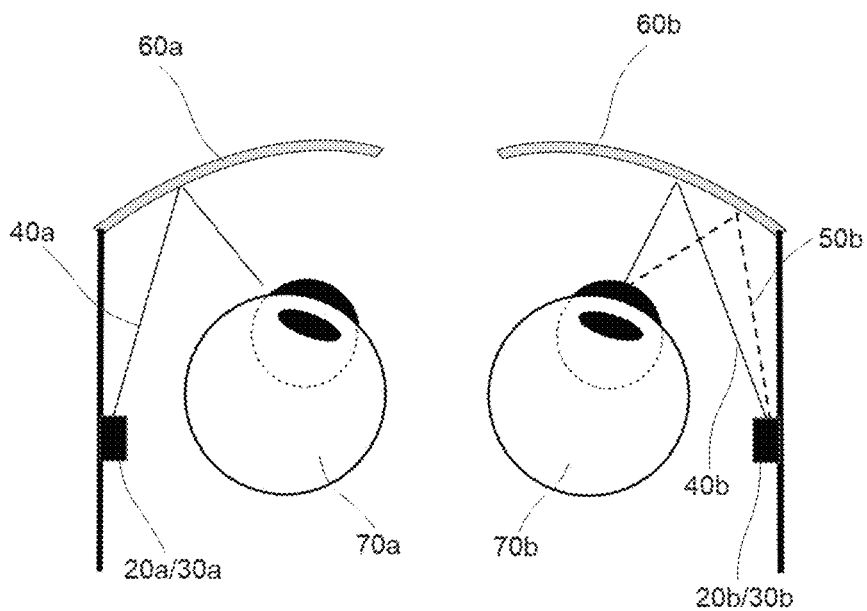

Reference is now made to FIGS. 4a and 4b presenting schematic diagrams illustrating detecting reflected IR light from individual's eyes in two positions. IR light sources 20a and 20b illuminate left and right eyes 70a and 70b by means of rays 40a and 40b, respectively. The light rays 50a and 50a and 50b reflected from eyes 70a and 70b are detected by cameras 30a and 30b, respectively. In FIG. 4a, the individual looks straight ahead and rays 40a and 40b are incident on to cornea areas of eyes 70a and 70b (described below in detail). Reflected rays 50a and 50 are detectable by cameras 30a and 30b. FIG. 4b shows an individual's right-side look. Cornea area of left eye 70a is displaced to the right such that illuminating rays 40a do not reach the cornea area of left eye 70a. Therefore, the position of left eye 70a is not detectable while cornea area of eye 70b is illuminated by rays 40b from light source 20b so that reflected rays 50b are detected by camera 30b.

Figure 5:
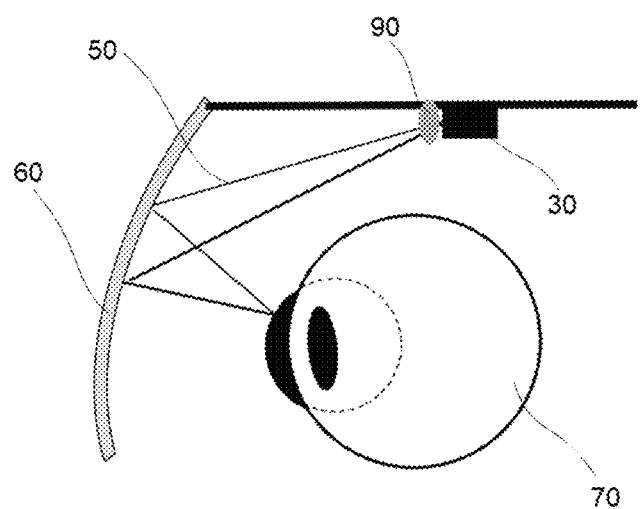
FIG. 5 is a schematic diagram of an eye tracking device provided with a lens focusing illuminating IR light on an individual's eye.

Reference is now made to FIG. 5 presenting a schematic diagram of eye tracking device provided with a filter on the optical path of an individual's eye to prevent undesired ambient light to the sensor. Specifically, filter 90 is configured for selecting beam 50 reflected from the cornea and pupil area of individual's eye 70. Spectral and polarization filters are in the scope of the present invention.

Figures 7A, 7B:
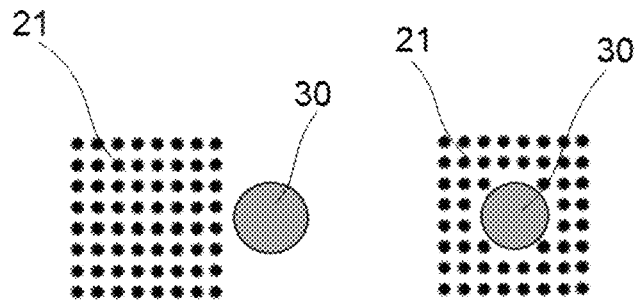
FIGS. 7a to 7c are schematic front views of alternative embodiments of an arrangement including a camera and a LED matrix.
Figure 7C:
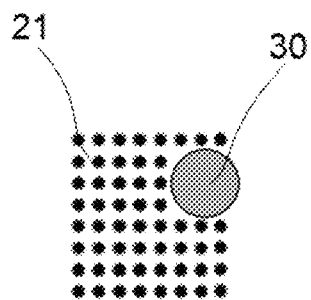
Figure 8A:
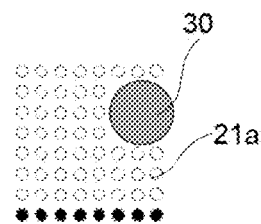
FIGS. 8a to 8h are schematic diagrams illustrating exemplary operation modes of a LED matrix.
Figure 8B:
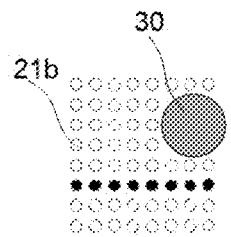
Figure 8C:
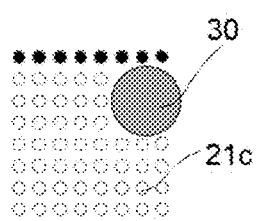
Figure 8D:
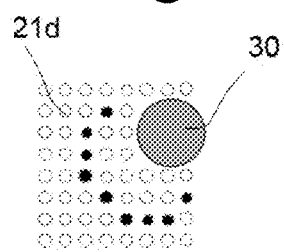
Figure 8E:
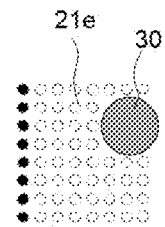
Figure 8F:
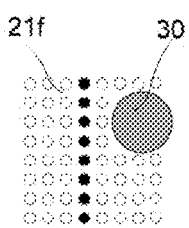
Figure 8G:
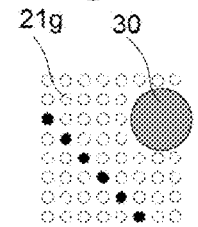
Figure 8H:
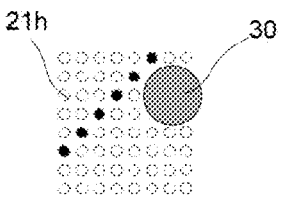

Reference is now made to FIGS. 6a to 6e and 7a to 7c presenting side and front view of exemplary embodiments light source and camera arrangement. FIGS. 6a to 6c show LED matrix 21 provided with alternatively configured lenses 61a to 61c. FIGS. 6d and 6e show prismatic structures 62a and 62b disposed in front of LED matrix 21. FIGS. 7a to 7c show alternative positions of camera 30 relative to LED matrix 21. The lenses and the prisms control the position of the reflected pattern on the cornea while keeping the position of the LED matrix near the sensor.

Figure 9A:
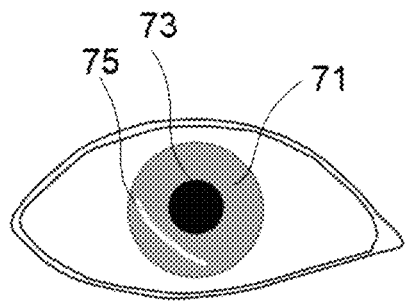
FIGS. 9a to 9d are schematic diagrams illustrating exemplary reflection patterns.
Figure 9B:
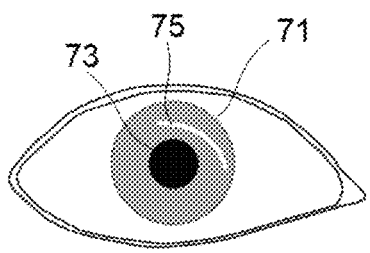
Figure 9C:
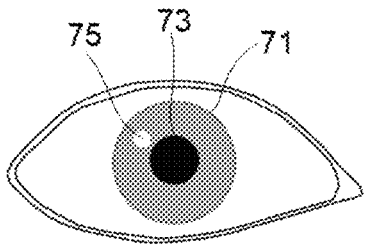
Figure 9D:
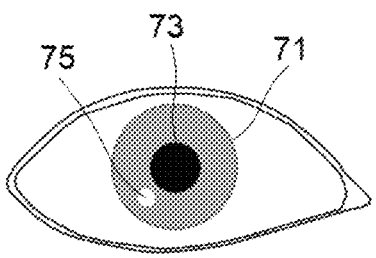

Reference is now made to FIGS. 8a to 8h presenting schematic diagrams illustrating exemplary operation modes of a LED matrix. Numerals 21a to 21h refer to alternative configuration of activated LEDs enabling variability of illuminating patterns. The processing unit is configured to activate predetermined arrays of said infrared light emitting diodes within said matrix of said infrared light emitting diodes and detect said pupil position and a corneal reflection within said captured images in correlation with said activated arrays of infrared light emitting diodes Reference is now made to FIGS. 9a to 9d presenting schematic diagrams illustrating exemplary reflection patterns. Specifically, numerals 71 and 73 refer to eye cornea and pupil, respectively. Reflections 75 on FIGS. 9a and 9b corresponds to linearly arranged activated LEDs of matrix 21. FIGS. 9c and 9d present reflection created by a localized group of LEDs.

Figure 10:
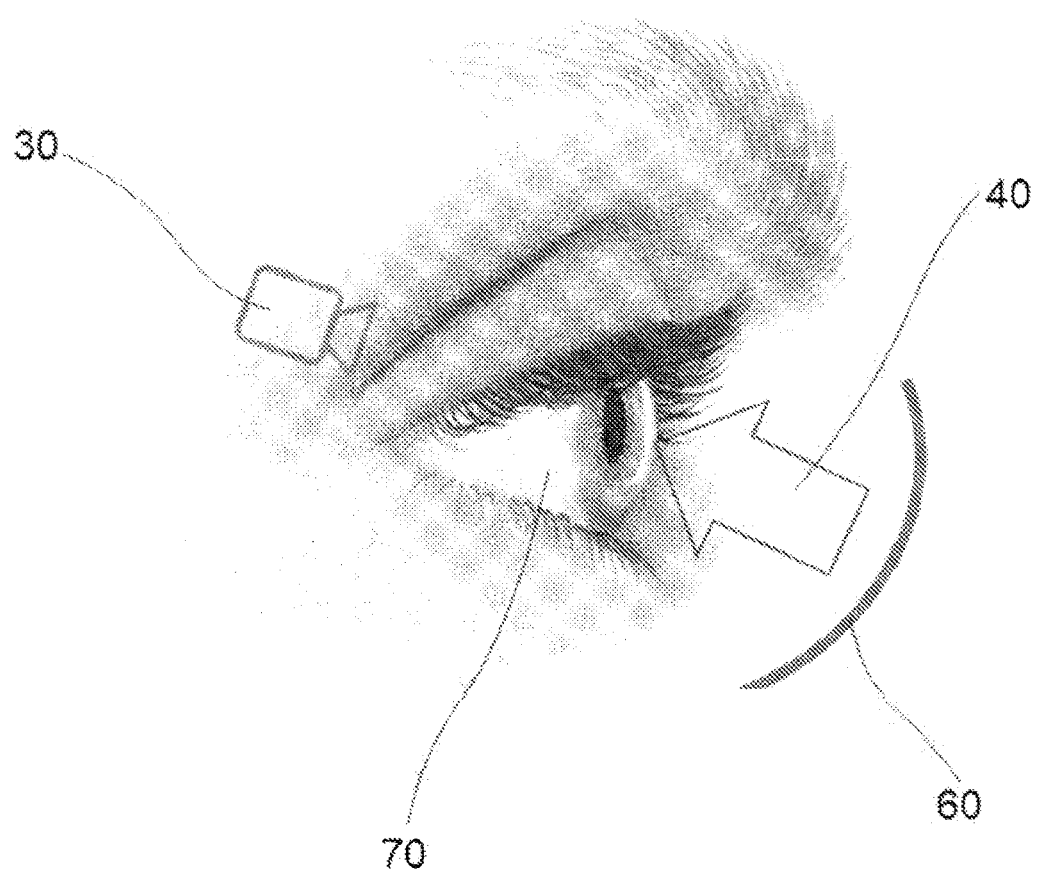
FIG. 10 is a schematic diagram of an exemplary compact embodiment of an eye tracking device.

Reference is now made to FIG. 10 that illustrates an exemplar compact embodiment of the eye tracking device of the present invention. Dichroic lens 60 directs infrared beam 40 to individual's eye 70 from below. The present orientation prevents the pupil and cornea area from shading an upper eyelid while keeping a compact structure of the eyewear.

The invention claimed is:

1. An arrangement for tracking a position of an individual's eye; said arrangement comprising:
   a. a frame mountable on a head of an individual;
   b. at least one visually transparent element mounted within said frame in a field of view of an eye of said individual symmetrically relative to a sight line thereof;
   c. at least one infrared light source; said at least one infrared light source configured for emitting an infrared light beam;
   d. at least one image sensor configured for capturing images of said eye;
   e. a processing unit configured for controlling said at least one infrared light source and said at least one image sensor and detecting a pupil position and a corneal reflection within images captured by said at least one image sensor;
   wherein said at least one visually transparent element comprises at least two components having internal curvilinear conformal contact surfaces adjacently disposed to each other and inclined relative to said sight line; at least one of said contact surfaces carries a spectrally selective reflective layer configured for reflecting said infrared light beam such that said infrared light beam emitted by said at least one infrared light source is directed onto said eye and directing infrared radiation reflected from a pupil and cornea of said eye to said at least one image sensor;

wherein both a front surface and a rear surface of said spectrally selective reflective layer is smooth;

wherein the said at least one infrared light source comprises a plurality of infrared light sources arranged in a predetermined pattern as an infrared LED matrix that is coplanar and directly adjacent the at least one image sensor;

wherein a refractive prismatic structure is provided directly in front of the infrared LED matrix in the light propagation direction between the infrared LED matrix and said visually transparent element;

said processing unit being configured to activate at least one predetermined array of said plurality of infrared light sources to detect said pupil position and corneal reflection within said captured images in correlation with said activated predetermined array of said plurality of infrared light sources.

2. The arrangement according to claim 1, wherein said spectrally-selective reflective layer is configured for spectrally selective focusing of said IR beam.

3. The arrangement according to claim 1, wherein said frame is selected from the group consisting of spectacles, corrective glasses, protective glasses, a virtual reality device, an augmented reality device and any combination thereof.

4. The arrangement according to claim 1, wherein said processing unit is configured for predicting directions of eye movements and landing a gaze position within the field of view of said individual.

5. The arrangement according to claim 3, comprising a display and an optical arrangement cooperatively configured for anticipatorily projecting an image or a movie of an object of interest via said at least one visually transparent element being a combining optical element of said virtual reality device or said augmented reality device projecting an image at a location matching a future gaze location within said field of view of said eye such that said object of interest is in sight of said individual.

6. The arrangement according to claim 1, wherein said spectrally-selective reflective layer is a dichroic coating.

7. The arrangement according to claim 1, wherein at least one of said curvilinear conformal contact surfaces carries said spectrally selective reflective layer selected from the group consisting of a dichroic coating; a corrugate surface, a diffractive optical element and any combination thereof.

8. The arrangement according to claim 1, wherein said curvilinear conformal contact surfaces are formed in a shape selected from the group consisting of a spherical shape, an aspherical shape, a cylindrical shape and any combination thereof.

9. A method of tracking a position of an individual's eye; said method comprising steps of:

a. providing an arrangement for tracking a position of an individual's eye; said arrangement comprising:
  i. a frame mountable on a head of an individual;
  ii. at least one visually transparent element mounted within said frame in a field of view of an eye of said individual symmetrically relative to a sight line thereof;
  iii. at least one infrared light source; said at least one infrared light source configured for emitting an infrared light beam;
  iv. at least one image sensor configured for detecting infrared light reflected from said eye;
  said at least one visually transparent element comprises at least two components having internal curvilinear conformal contact surfaces adjacently disposed to each other and inclined relative to said sight line; at least one of said contact surfaces carries a spectrally selective reflective layer configured for reflecting said infrared light beam such that said infrared light beam emitted by said at least one infrared light source is directed onto said eye and directing infrared radiation reflected from a pupil and cornea of said eye to said at least one image sensor;
  a processing unit configured for controlling said at least one infrared light source and said at least one image sensor and recognizing detecting a pupil position and corneal reflection within images captured said at least one image sensor;
b. emitting said infrared light beam by said at least one infrared light source;
c. illuminating said eye by said infrared light beam directed thereto by said at least one visually transparent element;
d. detecting pupil position and corneal reflection positions and deformation within an image of said eye reflected by said at least one visually transparent element; and
e. obtaining an eye movement trajectory using said an image processing unit; wherein both a front surface and a rear surface of said spectrally selective reflective layer is smooth;

wherein the said at least one infrared light source comprises a plurality of infrared light sources arranged in a predetermined pattern as an infrared LED matrix that is coplanar and directly adjacent the at least one image sensor;

wherein a refractive prismatic structure is provided directly in front of the infrared LED matrix in the light propagation direction between the infrared LED matrix and said visually transparent element;

said processing unit being configured to activate at least one predetermined array of said plurality of infrared light sources to detect said pupil position and corneal reflection within said captured images in correlation with said activated predetermined array of said plurality of infrared light sources.

* * * * *